US006592309B1

(12) United States Patent
Baughey

(10) Patent No.: US 6,592,309 B1
(45) Date of Patent: Jul. 15, 2003

(54) PACKAGING CLIP AND PACKAGE

(75) Inventor: Mark L. Baughey, Hartford City, IN (US)

(73) Assignee: HP Products Co., Hartford City, IN (US)

( * ) Notice: Subject to any disclaimer, the term of this patent is extended or adjusted under 35 U.S.C. 154(b) by 0 days.

(21) Appl. No.: 09/961,574

(22) Filed: Sep. 24, 2001

(51) Int. Cl.$^7$ .................................................. B60P 7/12
(52) U.S. Cl. ...................................... 410/42; 211/59.4
(58) Field of Search ............................ 410/32, 36, 37, 410/39, 40, 42; 206/443, 446; 211/59.4, 60.1, 70.4; 248/68.1

(56) References Cited

U.S. PATENT DOCUMENTS

| 3,004,746 | A | * | 10/1961 | Swingle ........................ 410/35 |
| 3,581,907 | A | * | 6/1971 | Schmidt ........................ 211/194 |
| 3,685,460 | A | * | 8/1972 | Steele et al. ............. 108/57.17 |
| 3,812,792 | A | * | 5/1974 | La Belle ..................... 108/56.1 |
| 3,945,497 | A | * | 3/1976 | Greenberg ................. 211/70.4 |
| 4,076,199 | A | * | 2/1978 | Paulsen ..................... 248/68.1 |
| 4,079,835 | A | * | 3/1978 | Kendig ........................ 206/416 |
| 4,099,626 | A | * | 7/1978 | Magnussen, Jr. .......... 211/60.1 |
| 4,453,471 | A | * | 6/1984 | Harrington et al. ........ 108/55.1 |
| 4,492,499 | A | * | 1/1985 | Gasper ........................ 410/32 |
| 5,269,639 | A | * | 12/1993 | Ryder, Jr. .................... 410/122 |
| 5,354,020 | A | * | 10/1994 | Richards ..................... 248/68.1 |
| 5,722,328 | A | * | 3/1998 | Darby ......................... 108/55.1 |
| 6,003,449 | A | * | 12/1999 | Manidis ...................... 108/54.1 |
| 6,158,931 | A | * | 12/2000 | Savard ........................ 410/40 |
| 6,261,037 | B1 | * | 7/2001 | Richards et al. .............. 410/36 |
| 6,431,372 | B1 | * | 8/2002 | Aoyama ..................... 211/59.4 |

FOREIGN PATENT DOCUMENTS

JP         01271310    * 10/1989  ................. 206/443

* cited by examiner

Primary Examiner—D. Glenn Dayoan
Assistant Examiner—Paul Chenevert
(74) Attorney, Agent, or Firm—Krieg DeVault Lundy, LLP

(57) ABSTRACT

A new and improved packaging clip comprising alternating upward and downward U-channels for receiving the upstanding flat-edged end boards of industrial-sized textile rolls stacked on a pallet for shipping purposes. The new clip is a single, stamped galvanized metal piece having three distinct U-channels aligned longitudinally and having a common middle support portion. The outer channels are open in a direction opposite that of the middle channel. The outer channels also each receive a single end board. The middle channel receives generally equal amounts of the edges of two end boards placed adjacent to each other on a pallet. The outer channels each receive the edge of one of two adjacently placed end boards, each outer channel being capable of gripping the end board received therein in the event that the fit therein is too loose. This new and improved U-channel packaging clip maintains the alignment of flat-edged end boards stacked 2×2. Each of the channels has rounded corners for safety. The new and improved packaging clip allows for a plurality of palletized roll packages other than the conventional 2×2 package.

27 Claims, 5 Drawing Sheets

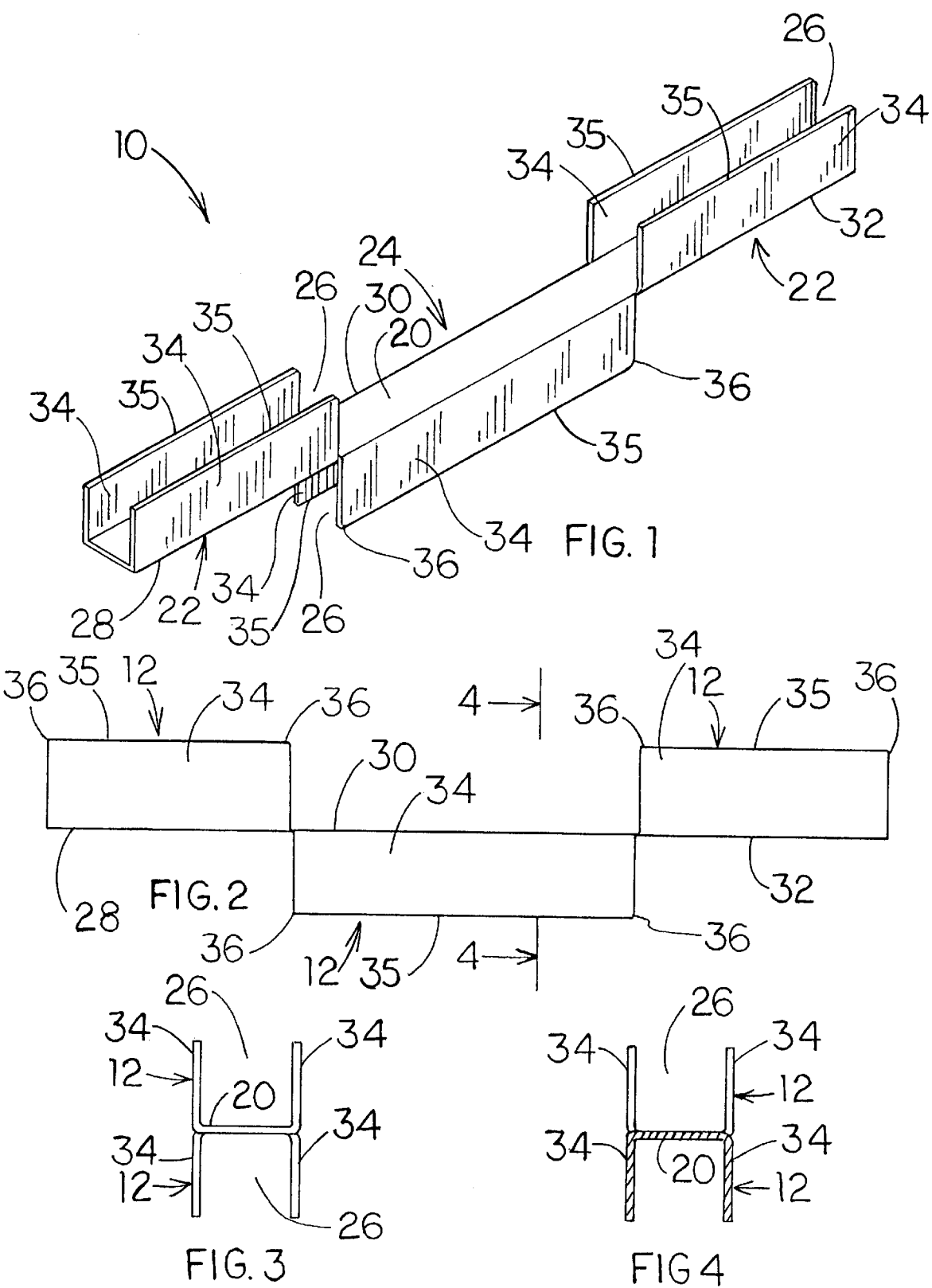

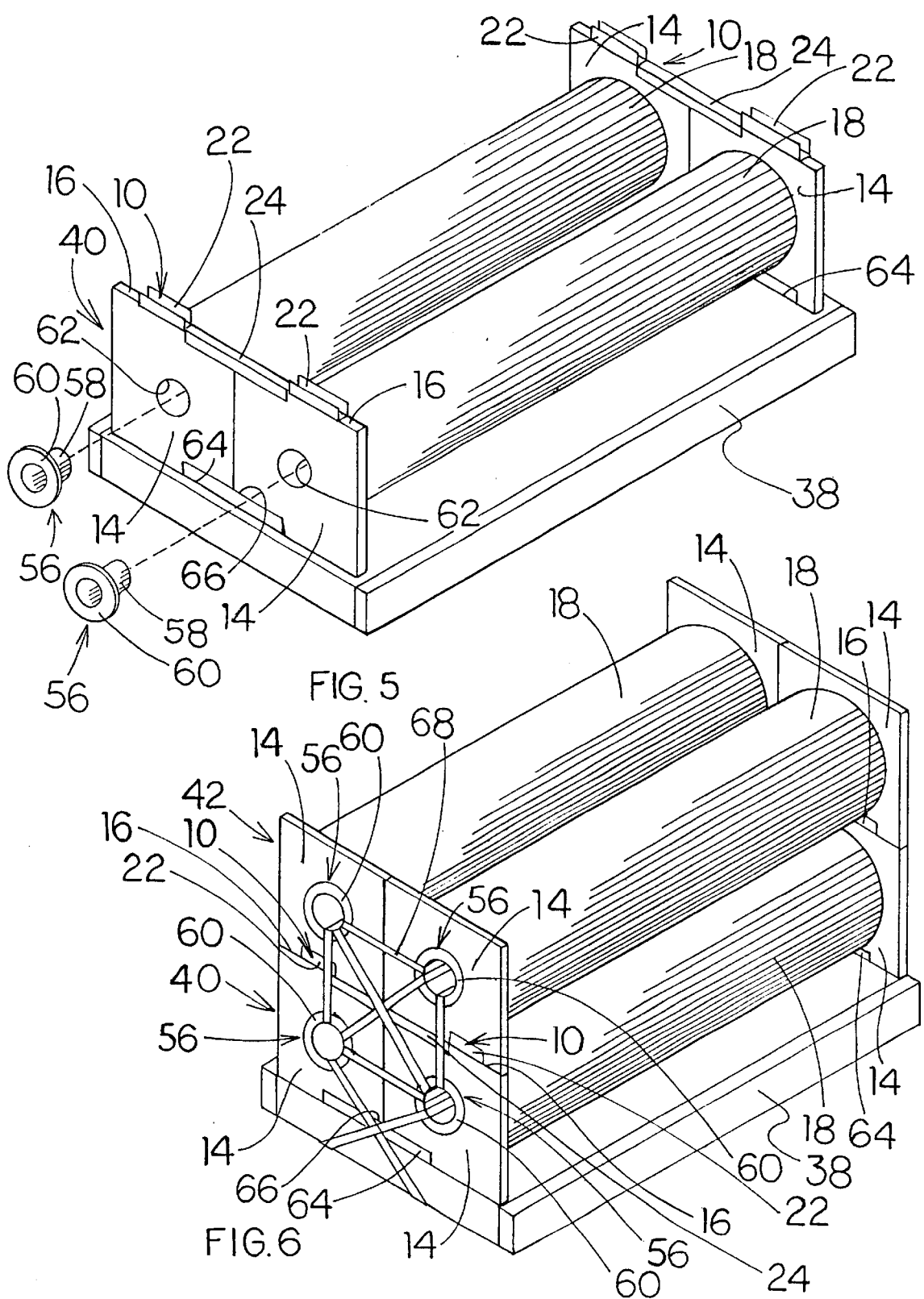

PACKAGING CLIP AND PACKAGE

BACKGROUND OF THE INVENTION

The present invention pertains to packaging clips and palletized packages, and more particularly to a new alternating U-channel clip for supporting and maintaining the stable spatial relation of upstanding end boards on an industrial-sized textile roll palletized package.

Packaging clips have previously been used in the textile industry for packing large rolls of textiles, such as paper or plastic film. Use of clips is a safer and more secure way to load and ship a pallet of rolls for shipment to customers when used in connection with rectangular or square rigid end boards connected to the ends of each roll by roll plugs. The flat edges of end boards prevent the rolls from rolling as they sit on a surface. By using end boards, rolls may be elevated from the pallet, spaced from other rolls, and more securely stacked on a pallet than may be accomplished by attempting to place rolls directly on a pallet without end boards. Without end boards, rolls are susceptible to engaging each other and becoming damaged or rolling off the pallet and thus require greater attention and effort to ensure secure placement on the pallet. Packaging clips are used to secure end boards to a pallet. Packaging clips are used for receiving and stabilizing the placement of end boards on the pallet and their alignment with each other.

In general, upstanding rectangular or square end boards are secured to the ends of a roll by roll plugs, and multiple rolls are stacked on a pallet in a spaced condition. End boards keep the rolls separated and connected to the pallet. In order to stabilize the spacial relation of end boards on the pallet, U-channel clips are secured to the pallet and the end board edges are inserted into the clips which act as rails to limit the lateral movement in two directions. The remaining directions of lateral movement are limited by polymeric or metal banding securing the rolls to the pallet.

Depending on the size of the rolls, multiple rolls may be placed on a single pallet, and stacked on top of one another in a spaced relation. Although the flat edges of the end boards allow for level stacking of rolls, movement and shaking while a pallet is lifted by a forklift or otherwise transported makes it likely that the alignment of the end boards will shift. As a result, H-channel clips have been used to accurately position and maintain the alignment of end boards of rolls stacked on top of each other. The bottom channel of the H-channel clip is placed on the top edges of the end boards on the bottom of the pallet. The stacked rolls are then placed in the top channel of the H-channel clip, which serves like the U-channel clip secured to the pallet for the lower rolls to limit the movement of the top rolls in relation to the bottom rolls and to each other. The H-channels used for this purpose, while generally adequate, have general inadequacies that parties who engage in shipping rolls this way have demanded be overcome with an improved design. Therefore, it is highly desirable to provide a new and improved packaging clip for the stable stacking of rolls on a pallet.

The H-channel clips currently used for stacking rolls with flat-edged end boards are generally manufactured of extruded aluminum. As a result, although relatively light in weight, they have a greater tendency to be bent out of their proper shape, making the clip useless for its intended purpose. Also, extruded aluminum is relatively expensive compared to other more rigid metals. Upstanding end boards used for rolls have a relatively wide range of tolerances with regard to the thickness of the board. The H-clips have a much narrower range of tolerances in order to be almost uniform in dimension from clip to clip. As a result, when a board is inserted into a clip, the fit of the board in the clip may be tight or loose. For the lower rolls placed directly on a pallet, a loose fit is generally of little concern because the U-channel clip attached to the pallet and the H-channel clip used for stacking, in addition to the weight of the upper rolls, give the lower rolls an added stability in addition to the advantage of having a lower center of gravity. However, a loose fit for stacked rolls placed in the top channel of an H-channel clip can result in decreased stability in their alignment with each other that is more difficult to compensate for. As a result, extra care in banding the rolls to the pallet must be taken. Thus it is also highly desirable to provide a new and improved packaging clip manufactured of a more rigid material that is less expensive and that is less likely to suffer accidental bending or altering of its useful shape. It is also highly desirable to provide a new and improved packaging clip that can be adjusted to individually grip end boards of upper rolls stacked on lower rolls in order to stabilize the alignment of the upper rolls.

Packaging clips commonly used for stacking rolls often have sharp corners on the upstanding sides. The sharp corners can result in scratches and gouges in the rolls themselves that damages the first few layers of the rolled material, or even cause bodily injury to the persons handling the clips. Thus it is also highly desirable to provide a new and improved packaging clip that has rounded corners less likely to cause scratches, gouges, or human bodily injury.

Finally, it is highly desirable to provide a new and improved packaging clip having all of the above identified features.

SUMMARY OF THE INVENTION

It is therefore an object of the invention to provide a new and improved packaging clip for the stable stacking of rolls on a pallet.

It is also an object of the invention to provide a new and improved packaging clip manufactured of a more rigid material that is less expensive and that is less likely to suffer accidental bending or altering of its useful shape.

It is also an object of the invention to provide a new and improved packaging clip that can be adjusted to individually grip end boards of upper rolls stacked on lower rolls in order to stabilize the alignment of the upper rolls.

It is also an object of the invention to provide a new and improved packaging clip that has rounded corners less likely to cause scratches, gouges, or human bodily injury.

It is finally an object of the invention to provide a new and improved packaging clip having all of the above identified features and a new palletized roll package.

In the broader aspects of the invention, there is provided a new and improved packaging clip comprising alternating upwardly and downwardly facing U-channels for receiving the upstanding flat-edged end boards of industrial-sized textile rolls stacked on a pallet for shipping purposes The new clip is a single, elongated galvanized metal piece having three distinct U-channels aligned longitudinally and having a common middle support portion. The outer channels are open in a direction opposite that of the middle channel. The outer channels also each receive the edges of a single end board. The middle channel receives generally equal amounts of the edges of two end boards placed adjacent to each other on a pallet. The outer channels each receive the edges of one of two adjacently placed end boards, each outer channel being capable of gripping the end board received therein in the event that the fit therein is too loose. This new and improved U-channel packaging clip maintains the alignment of flat-edged end boards stacked 2×2 (#columns×#rows). Each of the channels has rounded corners for safety. The new and improved packaging clip allows for a plurality of palletized roll packages other than the conventional 2×2 package.

BRIEF DESCRIPTION OF DRAWINGS

The above mentioned and other features and objects of the invention and manner of attaining them will become more apparent and the invention itself will be better understood by reference to the following description of an embodiment of the invention taken in conjunction with the accompanying drawings wherein:

FIG. 1 is a perspective view of a new and improved packaging clip of the invention;

FIG. 2 is a side view of the packaging clip of the invention shown in FIG. 1;

FIG. 3 is an end view of the packaging clip of the invention shown in FIG. 1;

FIG. 4 is a cross-sectional view of the packaging clip of the invention shown in FIG. 2 taken essentially along line 4—4;

FIG. 5 is a perspective view showing the proper placement of the packaging clip of FIG. 1 on the end boards of the lower row of rolls on a shipping pallet;

FIG. 6 is a perspective view showing the proper placement of the packaging clip of FIG. 1 between the end boards of rolls stacked 2×2×1 on a shipping pallet;

DESCRIPTION OF SPECIFIC EMBODIMENTS

Figure 7:
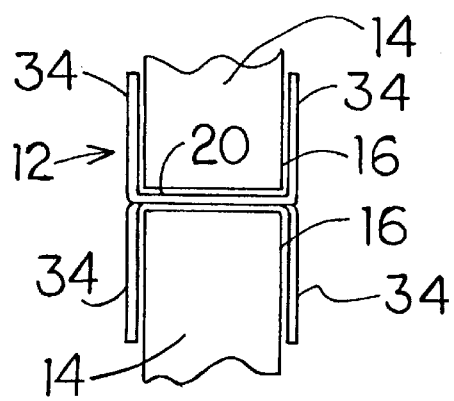
FIG. 7 is an end view of a loose fitting upper end board positioned in one of the outer U-channels of the packaging clip of FIG. 1.

FIGS. 1 through 9 illustrate the new and improved packaging clip 10 of the present invention. A packaging clip 10 is shown in FIG. 1 having a series of alternatingly facing U-channels 12 for receiving the flat edges 16 of upstanding end boards 14 on industrial rolls 18. The support portion 20 of each U-channel 12 is common among all channels 12. In the specific embodiment illustrated, outer U-channels 22, when the clip is held upright, face generally upwardly, whereas the middle U-channels 24 face generally downwardly. In other specific embodiments, the middle U-channel 24 faces upwardly whereas the outer U-channels 22 face downwardly. In yet other specific embodiments, the U-channels 12 are alternately spaced apart along the length of the support portion 20. See FIG. 7. Each U-channel 12 has an opening 26 for receiving the edge 16 of an end board 14.

Figure 9:
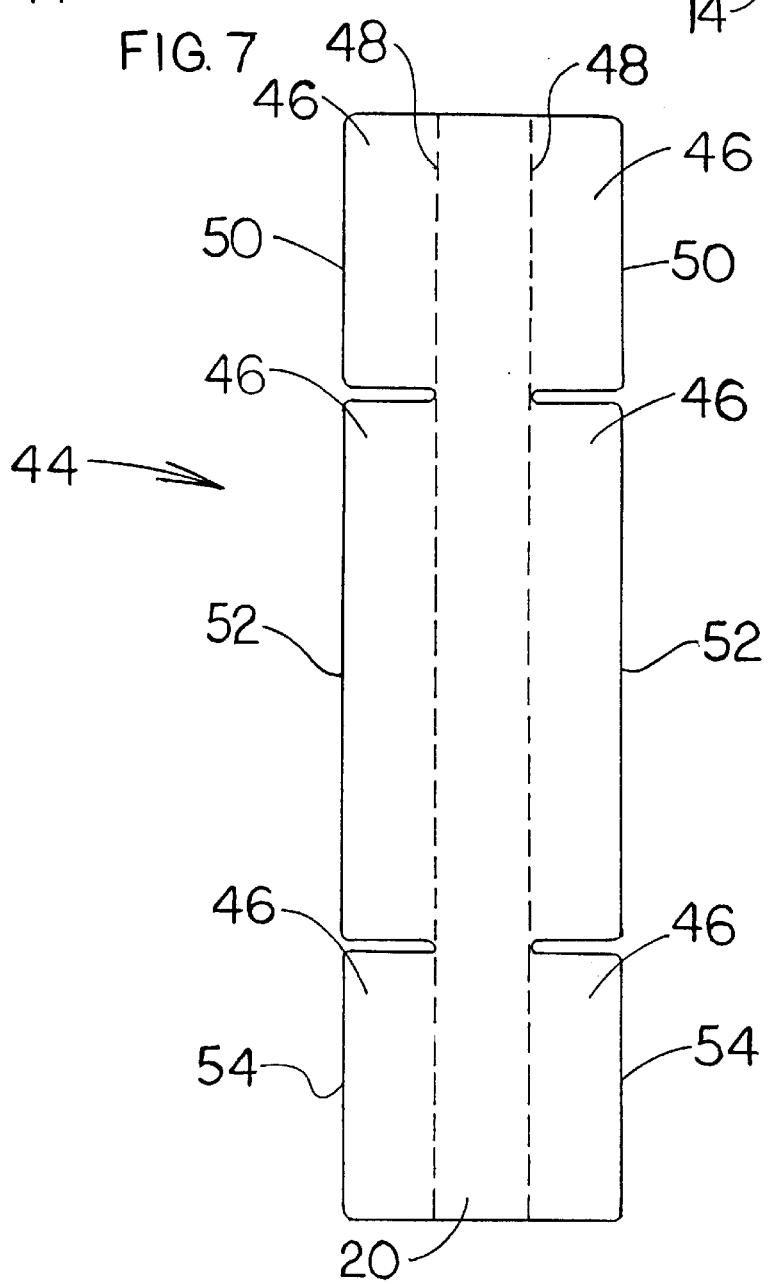
FIG. 9 is a top view of a stamped metal piece for forming the packaging clip of FIG. 1.

FIG. 9 shows a single stamped metal piece 44 for forming into a packaging clip 10 of the present invention. The support portion 20 is a rectangular piece having six side members 46 extending from its longitudinal perimeter 48. Each of the side members 46 corresponds to an upstanding side 34 of one of the U-channels 12 of the packaging clip 10, and matches a side member 46 extending from the opposite side of the longitudinal perimeter. In order to form the clip 10, the side members 46 are bent along the crease lines generally co-located at the longitudinal perimeter 48 and stamped into the metal piece 44 until they are generally perpendicular to the support portion 20. In order to form alternatingly facing U-channels 12, the side members 46 are bent to extend perpendicularly from the support portion 20 in alternatingly opposite directions along the perimeter. Matching side members 50, 52, 54 on opposite sides of the longitudinal perimeter of the support portion 20 are alternatingly bent in the same direction.

In final form, a clip 10 of the present invention illustrated in FIGS. 1–9 has three alternatingly facing U-channels 12 that serve as first, second and third receiving members 28, 30, 32 for maintaining the alignment and spacial relation of a plurality of flat-edged end boards 14 positioned vertically and horizontally adjacent to one another. Each receiving member 28, 30, 32 comprises two upstanding sides 34 extending perpendicularly from the support portion 20 forming each U-channel 12, and generally defines the opening 26 oppositely disposed from the support portion 20, through which the receiving members 28, 30, 32 receive the edges 16 of an upstanding end board 14.

In a specific embodiment, the alternatingly facing U-channels 12, in profile, form essentially an H shape, as shown in FIG. 3, and are one continuous piece of stamped metal. In other specific embodiments, the metal with which the clip 10 is manufactured is iron based. In yet other specific embodiments, the iron based metal is resistant to rusting. In other specific embodiments, the metal is galvanized. In yet other specific embodiments, the metal is stainless steel.

The metal with which the clip 10 is manufactured should be rigid enough to withstand normal forces experienced in handling prior to assembling, assembling the package and during shipping. In a specific embodiment, the clip 10 is sufficiently rigid so as to be durable for multiple packaging uses. In other specific embodiments, notwithstanding the rigidness of the clip 10 from the metal with which it is manufactured, the clip 10 is also malleable enough such that the outer U-channels 22 may be manually pinched to grip an end board 14 inserted therein for which the fit is loose.

Referring now to FIG. 2, the upstanding sides 34 of the receiving members 28, 30, 32 have corners 36 at the distal ends 35 thereof from the support portion 20. In a specific embodiment, the corners 36 are rounded for safety purposes and for minimizing damage to people and objects commonly caused by sharp corners on metal pieces.

In a specific embodiment, the first receiving member 28 and third receiving member 32 have essentially equal length. In other specific embodiments, this length is between 4 and 8 inches. In yet other specific embodiments, the second receiving member 30 is between 12 inches and 20 inches long. Preferably, the support portion 20 of the clip 10 is between ¾ of an inch and 1¼ inches in width. In a specific embodiment, the thickness of any portion of the clip 10 is no more than ⅛ of an inch. In other specific embodiments, the upstanding sides 34 of the U-channels 12 extend from the support portion 20 to a height between ¾ of an inch and 2 inches. In yet other specific embodiments, the U-channels 12 are spaced apart along the length of the support portion 20 a distance of between ⅛ of an inch and 1 inch.

Figure 10:
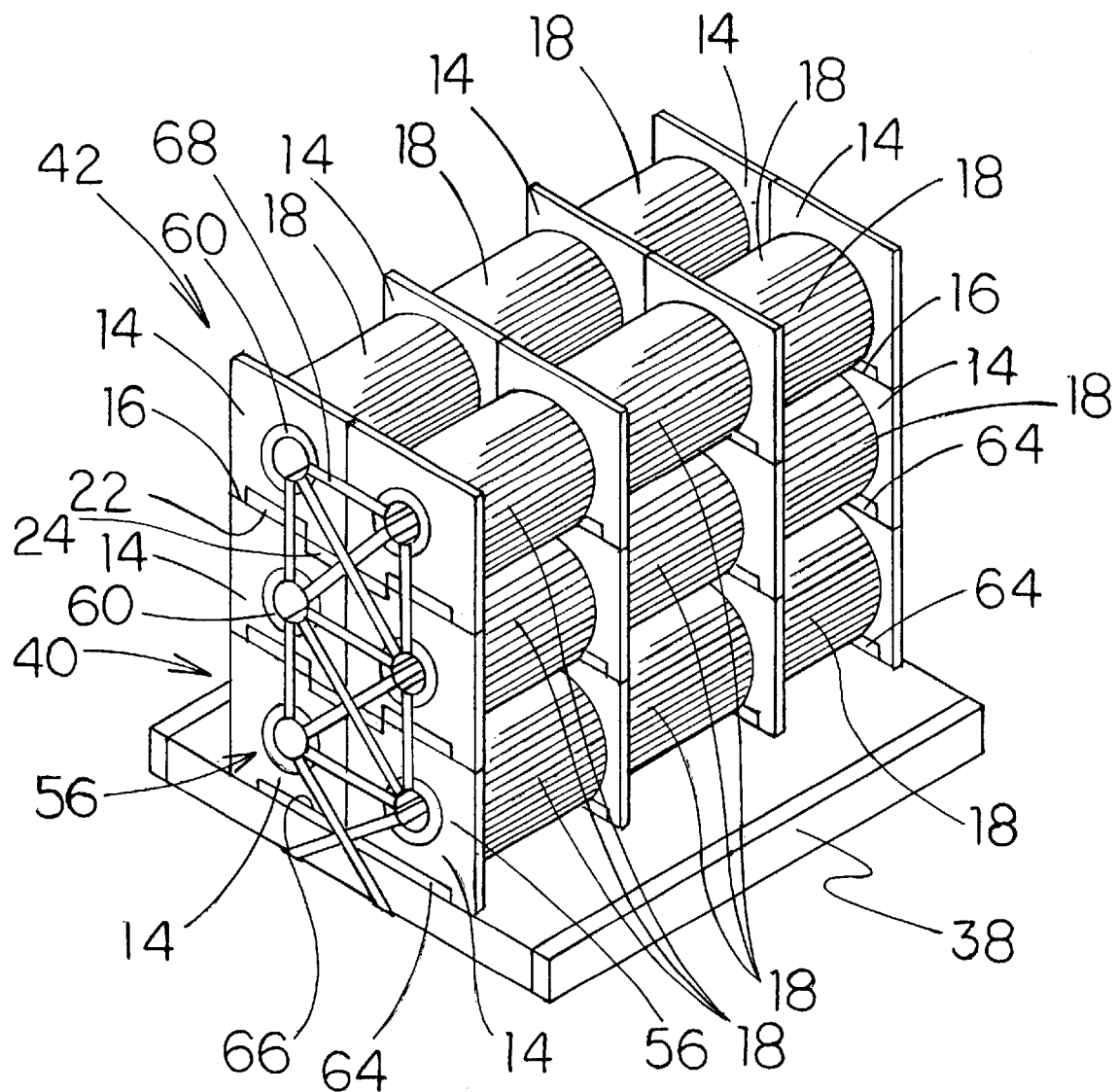
FIG. 10 is a perspective view like FIG. 6 showing the new and improved packaging clip of the invention illustrated in FIG. 1 between the end boards of rolls stacked 2×3×3 on a shipping pallet.
Figure 11:
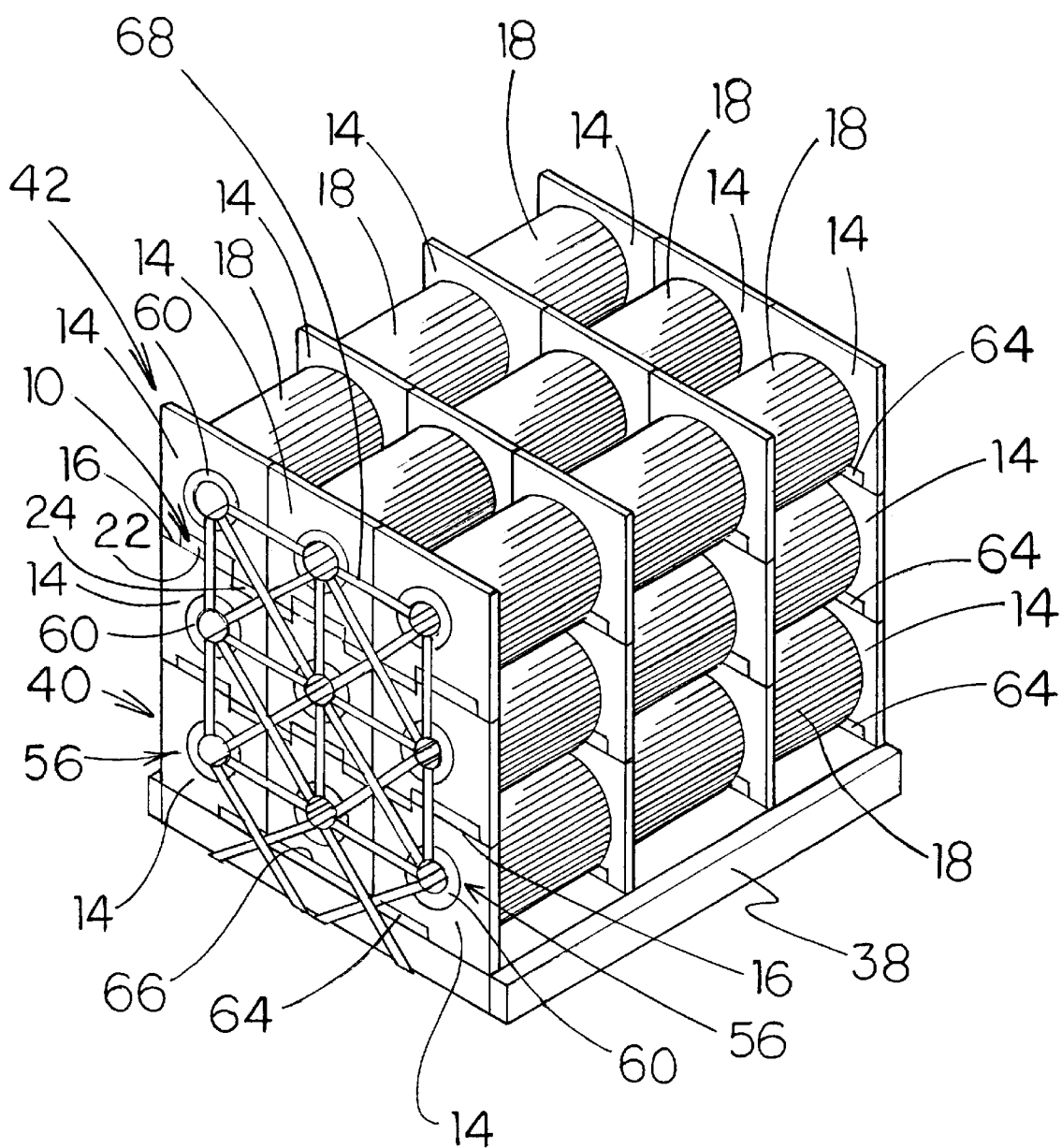
FIG. 11 is a perspective view like FIG. 6 showing the new and improved packaging clip of the invention illustrated in FIG. 1 between the end boards of rolls stacked 3×3×3 on a shipping pallet.

Referring to FIG. 11, there is shown a chip 10 that has three spaced apart upwardly facing U-channels 22 and two spaced apart downwardly facing U-channels 24. Each of these U-channels 22, 24 are identical to the U-channels 22, 24 described above and define receiving members for maintaining the alignment and spacial relation of a plurality of flat edged end boards 14 positioned vertically and horizontally adjacent to one another. Each of the receiving members comprise two upstanding sides 34 extending perpendicularly from the support portion 20 forming a U-channel 12, and generally defining an opening 26 oppositely disposed from the support portion 20 through which the receiving members receive the edges 16 of an upstanding end board 14. As shown in FIGS. 6, 10 and 11, each of the upstanding U-channels 22 are generally centrally spaced on an edge 16 of an end board 14 whereas each of the generally downwardly U-channels 24 span two contiguous end boards 14.

Referring now to FIGS. 5 and 6, in operation, the clip 10 of the present invention is positioned between rows 40, 42 of adjacent rolls 18 stacked on a pallet 38. The clip 10 is placed so that the second receiving member 30 removably receives generally equal amounts of the top edges 16 of the two upstanding end boards 14 of the bottom row 40 of adjacent rolls 18. The first receiving member 28 removably receives the bottom edge 16 of the first end board of the top row 42 of adjacent rolls 18 stacked on top of the bottom row 40. The third receiving member 32 removably receives the bottom edge 16 of the second end board of the top row 42 of adjacent rolls 18. The packaging clip 10 holds each of the top and bottom rows 40, 42 of adjacent rolls 18 in line, and holds the top row 42 in line with the bottom row 40. Movement among and between rows is limited by the packaging clip 10 such that unwanted shifting by relative movement of the end boards 14 and the pallet 38 and each other under normal forces experienced in moving and shipping of the pallet is avoided. For further security, metal or nylon banding 68 is used to strap the rolls 18 to the pallet 38 and to each other through the core plugs 56 and the core of each roll.

Figure 8:
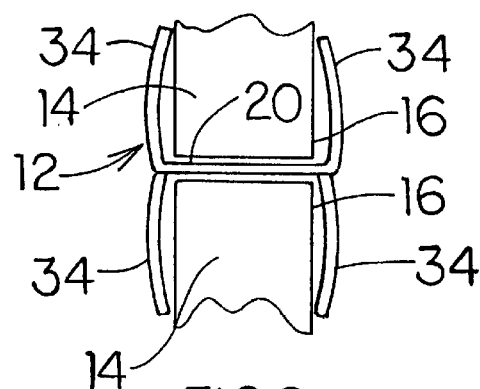
FIG. 8 is an end view of the end board and clip of FIG. 7 showing the pinched gripping of the loose fitting end board by the U-channel.

Referring now to FIGS. 7 and 8, in the event that the fit of an end board 14 in either the first receiving member 28 or third receiving member 32 is loose, the upstanding sides 34 of the particular receiving member may be pinched together using manual means, such as a pair of pliers or vice grips. In this way, the upstanding sides 34 grip against the end board 14 to frictionally retain the end board within the receiving member.

The present invention provides a new and improved packaging clip for the stable stacking of rolls 18 on a pallet 38. Each of the rolls 18 may weigh hundreds of pounds and comprise paper film or other sheet products rolled on a tubular core (not shown) having a value of thousands of dollars. The end boards 14 are affixed to each of the rolls 18 by core plugs 56 which are shown in FIG. 5 to have a tubular barrel 58 and a flange 60 at one end of the barrel 58. End boards 14 are affixed to each end of the rolls 18 by the core plug barrels 58 being positioned through the openings 62 in each of the end boards 14 with the barrels 58 frictionally fit into the tubular cores of the roll. Flange 60 holds the end board 14 to the roll 18. Each of the rolls 18 with end boards 14 attached may now be lifted by crane and positioned as desired.

Pallets 38 are prepared by affixing channels 64 having an upwardly opening groove 66 to the opposite ends of the pallet 38. The channels 64 are secured to the pallets 38 by nailing their base to the pallet through holes provided or by other conventional means. The upstanding grooves 66 are sized to receive the end boards 14 when the roll package is assembled.

In assembling the roll package for shipment, the rolls 18 with end boards 14 attached to the opposite ends as above described, are positioned on the pallet 38 with the end boards 14 positioned in the groove 66 of the channel 64 on the pallet 38 as shown in FIG. 5. In this position, because of the choice of the size of the end boards 14, each of the rolls 18 are spaced from the pallet and are spaced from each other. Each of the rolls 18 are also secured from movement longitudinally of the roll 18 with respect to the pallet 38 by the channel 64.

The packaging clip 10 then is positioned on the upper edge 16 of the end boards 14 of the bottom row 40 with the end boards 14 in channel 24 of clip 10 as shown in FIG. 5. Two additional rolls 18 with end boards 14 attached to their opposite ends by core plugs 56 as above described, are then positioned on top of the rolls 18 of the bottom row 40 positioning their end boards 14 in the upwardly facing channels 22 of the clip 10 as shown in FIG. 6. In an alternative embodiment (not shown), the clip 10 may be repositioned such that the channels 22 are downwardly facing and the channel 24 is upwardly facing. As such, the clip 10 is positioned on the upper edge 16 of the end boards 14 of the bottom row 40 with the end boards 14 in the channels 22, and two additional rolls 18 with end boards 14 attached to their opposite ends by core plugs 56 as above described are then positioned on top of the rolls 18 of the bottom row 40 positioning their end boards 14 in the upwardly facing channel 24 of the clip 10. Such repositioning in one embodiment comprises turning the clip 10 upside-down relative to the positioning of the clip 10 shown in FIGS. 5 and 6. Because of the size of the end boards, each of the rolls 18 of the top row 42 are spaced from the rolls 18 of the bottom row 40 and from each other and the clip 10 prevents the rolls from moving longitudinally of the row with respect to adjacent rolls and the pallet 38.

As positioned in the channels 22 and 24 of the packaging clip 10 of the invention, end boards 14 of the four rolls 18 stacked as shown in FIG. 6 are all positioned edge to edge. To limit the movement of any of the rolls 18 and to maintain the end boards 14 in their edge to edge position as shown in FIG. 6, the rolls 18 are secured to the pallet 38 by metal or nylon banding 68 through the core plugs 56 and the tubular cores of the rolls 18 and to the pallet 38 as shown in FIG. 6. This banding of the rolls 18 to the pallet 38 prevents the rolls 18 from moving transversely of the longitudinal direction of the roll 18 and from separating from each other or from the pallet 38.

Referring now to FIG. 10, there is shown the use of the new and improved packaging clip 10 of the invention as illustrated in FIGS. 1–9 in a package in which the clip is positioned between the end boards of rolls stacked 2×3×3 (i.e., 2 columns, 3 rows 3 deep) on a shipping pallet. Packaging clip 10 as used in the 2×3×3 package illustrated in FIG. 10 is the same packaging clip 10 illustrated in FIG. 6 and used in the 2×2×3 package illustrated in FIG. 6.

As illustrated in FIGS. 6 and 10, the packaging clip 10 may be utilized to package any number of a plurality of rolls 18 on a pallet provided that the dimensions of the palletized package do not exceed those required by shipping considerations.

Similarly, with reference to FIG. 11, the packaging clip 10 can be extended to include additional alternating U-channels 12 for receiving the flat edges 16 of additional end boards 14 so as to provide additional rolls to be packaged on a pallet. In the package illustrated in FIG. 11, the new and improved packaging clip 10 has a series of five alternatingly facing U-channels 12 instead of three with three spaced apart U-channels 22 and two spaced apart U-channels 24. With packaging clips 10 of this configuration, industrial rolls 18 may be palletized as shown in FIG. 11 in a 3×3×3 package or in a 3×2 package (not shown) in the same manner as described herein above with regard to the 2×2×1 package illustrated in FIG. 6 and in the 2×3×3 package shown in FIG. 10. How many rolls can be packaged on a single pallet is totally dependent upon the dimensions of the rolls.

The present invention also provides a new and improved packaging clip manufactured of a more rigid material that is less expensive and that is less likely to suffer accidental bending or altering of its useful shape. The present invention further provides a new and improved packaging clip that can individually grip upper rolls stacked on lower rolls in order to stabilize the alignment of the upper rolls. The present invention provides a new and improved packaging clip that has rounded corners less likely to cause scratches, gouges, or human bodily injury, and is significantly less expensive than prior packaging clips.

Finally, the present invention provides and new and improved packaging clip having all of the above identified features.

While specific embodiments of the invention have been shown and described herein for purposes of illustration, the protection offered by any patent which may issue upon this application is not strictly limited to the disclosed embodiment; but rather extends to all structures and arrangements which fall fairly within the scope of the claims which are appended hereto:

What is claimed is:

1. A clip for maintaining and supporting a plurality of upstanding end boards of industrial rolls for packaging on a pallet, comprising: a plurality first receiving members connected to a middle support, at least one second receiving member connected to said middle support, said first receiving members being spaced apart by said second receiving members, said second receiving members being spaced apart by a first receiving member, said first and second receiving members and said middle support being formed of one contiguous longitudinal piece of material, said second receiving members being adjacently between a pair of said first receiving members along the length of said clip, each of said receiving members defining a generally rectangularly shaped inner surfaces each having an opening opposite said middle support, said first receiving members openings generally facing in the same direction, said second receiving member openings facing in opposite direction from said first receiving member opening, each of said receiving members being adapted to receive and removably hold an end portion of an end board.

2. The clip of claim 1 wherein said piece is manufactured of a stamped galvanized metal.

3. The clip of claim 1 wherein said piece is manufactured of stainless steel.

4. The clip of claim 1 wherein said first receiving members are each capable of being pinched to removably and frictionally hold an end board positioned therein.

5. The clip of claim 1 wherein said first receiving members and said second receiving member each have rounded corners.

6. A palletized roll package comprising a pallet, a plurality of spaced apart end boards, said end boards being arranged in pairs with a roll therebetween, said end boards being attached to said rolls by roll plugs extending through a central opening in each of said end boards and into the tubular barrel of each roll, said rolls being suspended by said end boards, said plurality of spaced apart end boards being stacked on said pallet in an edge to edge relationship in vertically spaced horizontally extending rows, a plurality of clips of claim 1, said clips being positioned between said horizontally extending rows of edge to edge end boards, said package being held together by strapping extending through the barrels of said rolls and across the bottom of said pallet.

7. A palletized roll package comprising a pallet having opposite ends, a pair of end board supports secured to said pallet at the opposite ends thereof, said end board supports having an upstanding U-shaped groove therein, a plurality of spools each having a barrel and a pair of end board flanges at the opposite barrel ends, said end board flanges being larger than said barrels, a first group of said spools arranged on said pallet with said end board flanges thereof positioned in said support grooves in edge to edge position, a clip of claim 1 being positioned on said end boards with said end board flanges positioned in said first receiving members, a second plurality of spools each having a barrel and a plurality of end barrel flanges at the opposite barrel ends, said end barrel flanges of said second plurality of spools being stacked on said first plurality of at least three spools with said end flanges in edge to edge relationship, said end barrel flanges of said second plurality of at least three spools being positioned in said second receiving members of said clips.

8. A palletized roll package comprising a pallet having opposite ends, a pair of end board supports secured to said pallet at the opposite ends thereof, said end board supports having an upstanding U-shaped groove therein, a plurality of spools each having a barrel and a pair of end board flanges at the opposite barrel ends, said end board flanges being larger than said barrels, a first group of said spools arranged on said pallet with said end board flanges thereof positioned in said support grooves in edge to edge position, a clip of claim 1 being positioned on said end boards with said end board flanges positioned in said first receiving members, a second plurality of spools each having a barrel and a plurality of end barrel flanges at the opposite barrel ends, said end barrel flanges of said second plurality of spools being stacked on said first plurality of spools with said end flanges in edge to edge relationship, said end barrel flanges of said second plurality of spools being positioned in said second receiving members of said clips, a second clip of claim 1 positioned on the upstanding edges of said second plurality of end board flanges, said second plurality of end board flanges being positioned in said first receiving members of said second clip, and a third plurality of spools each having a barrel and a pair of end board flanges at the opposite barrel ends, said third plurality of end board flanges being positioned in said second receiving members of said second clip.

9. The clip of claim 1 wherein said second receiving member generally equally receives first and second upstanding end boards adjacently aligned.

10. The clip of claim 9 wherein said first receiving members receive third and fourth upstanding end boards, respectively, said third and fourth end boards being adjacently aligned.

11. The clip of claim 10 wherein said third and fourth end boards are aligned generally horizontally with one another and are positioned generally vertically upward from said first and second end boards.

12. The clip of claim 10 wherein said third and fourth end boards are aligned generally horizontally with one another and are positioned generally vertically downward from said first and second end boards.

13. A clip for maintaining and supporting a plurality of upstanding end boards of industrial rolls for packaging on a pallet, comprising: first and second interconnected U-channels aligned generally longitudinally, said second U-channels being connected between said first U-channels, each of said U-channels having a bottom and generally upstanding oppositely facing sides connected thereto, said bottom being in common with each of said U-channels, said sides of each of said first U-channels extending from said bottom in an opposite direction from said sides of said second U-channels, each of said U-channels being adapted to receive and removably hold an end portion of an end board.

14. The clip of claim 13 wherein said first U-channels are each capable of being pinched to removably and frictionally hold an end board position therein.

15. The clip of claim 13 wherein said sides each have rounded corners.

16. The clip of claim 13 wherein said interconnected U-channels are formed of one contiguous longitudinal piece.

17. The clip of claim 16 wherein said piece is manufactured of a stamped galvanized metal.

18. The clip of claim 16 wherein said piece is manufactured of stainless steel.

19. The clip of claim 13 wherein said second U-channel generally equally receives first and second upstanding end boards adjacently aligned with one another.

20. The clip of claim 19 wherein said first U-channel receive third and fourth upstanding end boards, respectively, said third and fourth end boards being adjacently aligned with one another.

21. The clip of claim 20 wherein said third and fourth end boards are aligned generally horizontally with one another and are positioned generally vertically upward from said first and second end boards.

22. The clip of claim 20 wherein said third and fourth end boards are aligned generally horizontally with one another and are positioned generally vertically downward from said first and second end boards.

23. A clip for maintaining and supporting a plurality of upstanding end boards of industrial rolls for packaging on a pallet, comprising: a first portion for removably holding a first upstanding end board, a second portion for removably holding a second upstanding end board, a third portion for removably holding generally equal amounts of third and fourth upstanding end boards, and a middle support, said middle support being disposed such that it is in common with said first portion, said second portion and said third portion, said first portion having a first opening for removably receiving said first end board, said second portion having a second opening for removably receiving said second end board, said third portion having a third opening for removably receiving said third and fourth end boards; wherein said first end board is inserted into said first opening of said first portion, said second end board is inserted into said second opening of said second portion, said third and fourth end boards are inserted into said third opening of said third portion, said clip limiting the movement of each of said first and second end boards relative to said third and fourth end boards with respect to normal forces experienced during packaging and shipment of industrial rolls.

24. The clip of claim 23 wherein said first and second portions and said middle support are formed of one contiguous piece.

25. The clip of claim 23 manufactured of a stamped galvanized metal.

26. The clip of claim 23 manufactured of stainless steel.

27. The clip of claim 23 wherein each of said first and second portions are capable of being pinched to removably and frictionally hold an upstanding end board positioned therein.

* * * * *